H. E. SMOCK.
CLEANING ATTACHMENT FOR HARROWS.
APPLICATION FILED FEB. 24, 1912.
1,027,920.
Patented May 28, 1912.
2 SHEETS—SHEET 2.
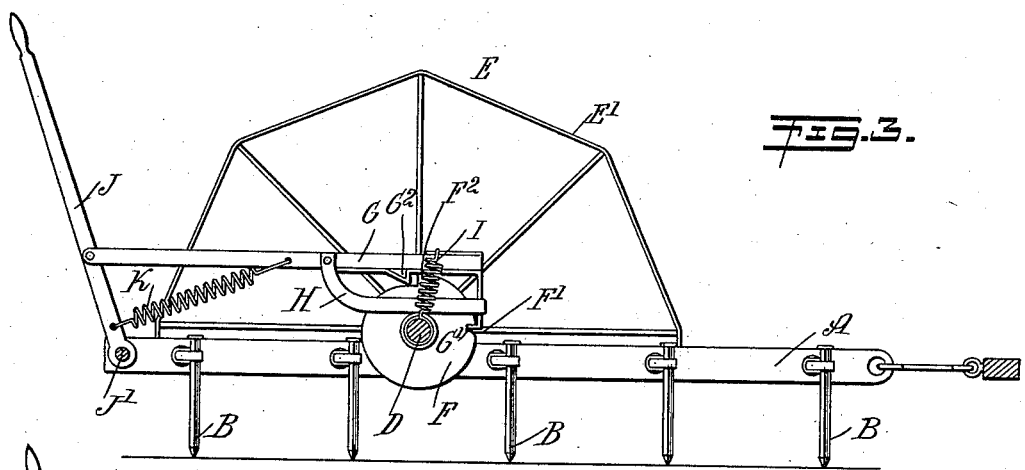
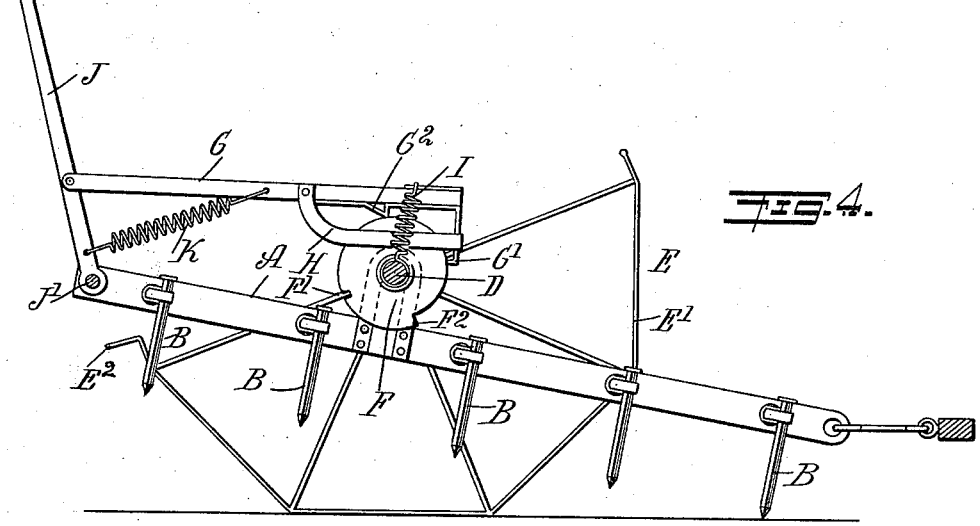
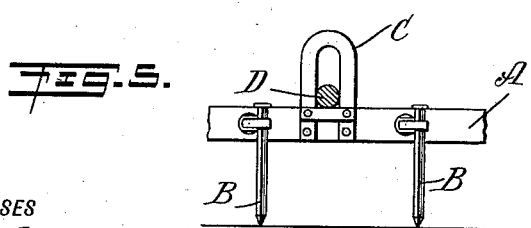
WITNESSES
INVENTOR
Harold E. Smock
BY
ATTORNEYS

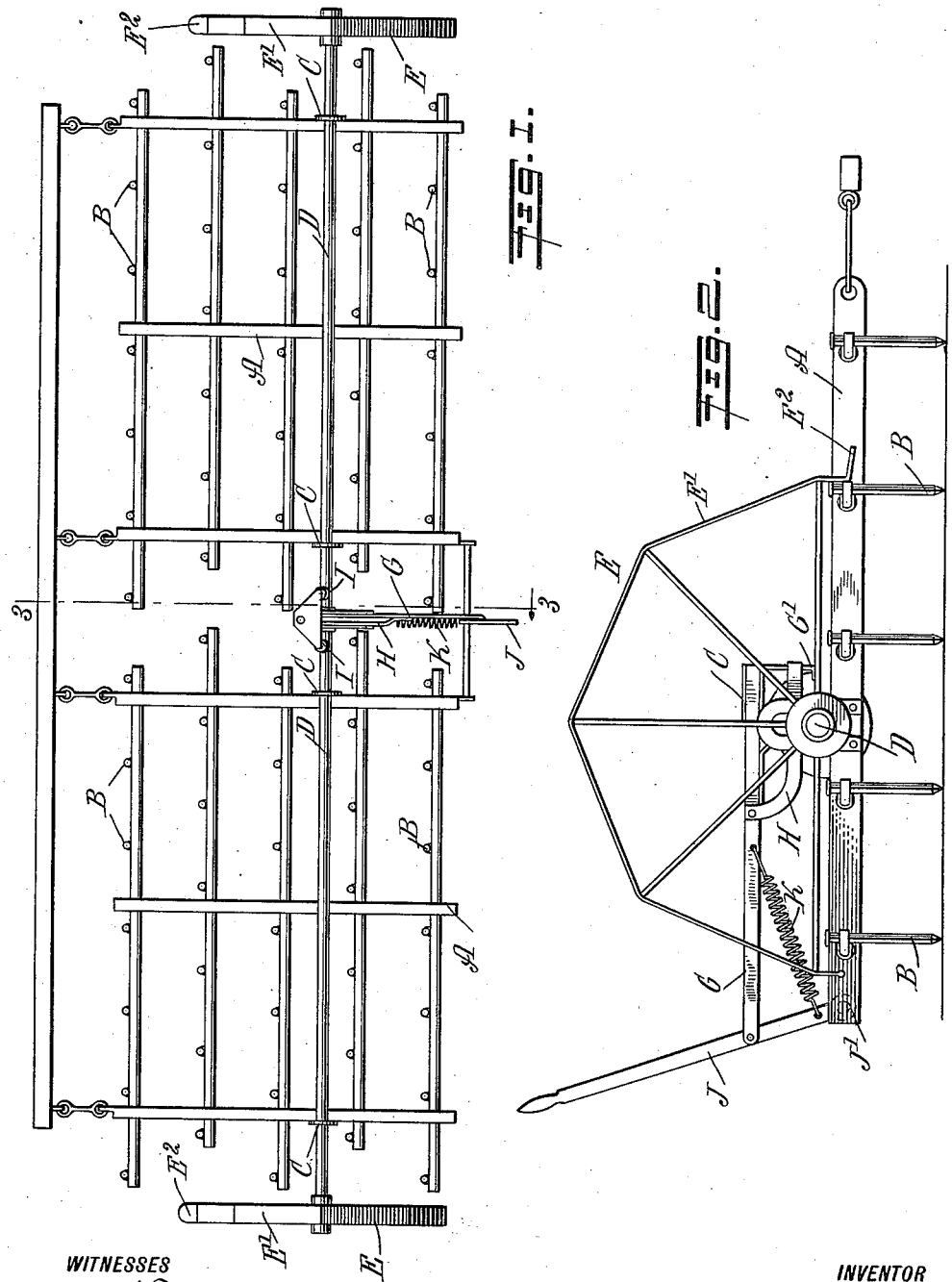

UNITED STATES PATENT OFFICE.

HAROLD E. SMOCK, OF MATAWAN, NEW JERSEY.

CLEANING ATTACHMENT FOR HARROWS.

1,027,920.   Specification of Letters Patent.   Patented May 28, 1912.

Application filed February 24, 1912. Serial No. 679,556.

*To all whom it may concern:*

Be it known that I, HAROLD E. SMOCK, a citizen of the United States, and a resident of Matawan, in the county of Monmouth and State of New Jersey, have invented a new and Improved Cleaning Attachment for Harrows, of which the following is a full, clear, and exact description.

The object of the invention is to provide a new and improved cleaning attachment for harrows arranged to permit convenient raising of the harrow as the latter is dragged over the ground, to permit the gathered-up weeds, brush, straw and the like to drop off the harrow thus cleaning the same of the accumulated matter.

For the purpose mentioned, use is made of a shaft extending transversely of the harrow and provided at its ends with segmental raising wheels normally off the ground, a cam on the said shaft and a manually-controlled locking and actuating bar engaging the same and adapted to hold the cam normally locked with the raising wheels in upper dormant position, the said bar being adapted to unlock and turn the said cam to engage the raising wheels with the ground.

A practical embodiment of the invention is represented in the accompanying drawings forming a part of this specification, in which similar characters of reference indicate corresponding parts in all the views.

Figure 1 is a plan view of the cleaning attachment as applied to a toothed harrow; Fig. 2 is an enlarged side elevation of the same; Fig. 3 is an enlarged transverse section of the same on the line 3—3 of Fig. 1; Fig. 4 is a similar view of the same with the parts of the cleaning device in active position; and Fig. 5 is a side elevation of one of the shaft bearings, the shaft being shown in cross section.

The harrow on which the cleaning attachment is applied is shown in the drawings as a toothed harrow, that is, is provided with the usual frame A supporting harrow teeth B. On the frame A are arranged a number of transversely-alined elongated bearings C in which is journaled a transverse shaft D provided on its ends with raising wheels E of segmental shape and each having a rim $E'$ in the form of a semipolygon, the forward end of each rim $E'$ terminating in a forwardly-projecting lug $E^2$, as plainly indicated in the drawings. The wheels E are arranged outside of the sides of the harrow and are normally in an uppermost dormant position so that the harrow teeth B engage the ground in the usual manner for harrowing the ground, and when it is desired to clean the teeth B of the gathered-up weeds, brush, straw and other extraneous matter then a turning motion is given to the shaft D sufficiently to engage the lugs $E^2$ with the ground whereby the lugs dig into the ground and on the further forward movement of the harrow A the raising wheels E are turned and the rims $E'$ finally engage the ground and thus lift the harrow A clear of the ground to permit the accumulated extraneous matter to drop off the harrow onto the ground at the same time carrying the harrow along in a raised position until the rear end of the harrow is clear of the dropped extraneous matter.

In order to impart an initial movement to the shaft D, the following arrangement is made: On the shaft D and preferably at the middle of the harrow is secured a cam F provided in its peripheral face with a notch $F'$ and a shoulder $F^2$, and the said notch $F'$ is adapted to be engaged by a locking lug $G'$ held on a locking and actuating bar G provided with a downwardly and forwardly-extending arm H resting on the top of the shaft D so as to slidingly support the said bar G. The bar G is also provided on its under side with a shoulder $G^2$ adapted to engage the shoulder $F^2$ of the cam F to turn the latter on pushing the bar G in a forward direction. Normally the bar G is in the position shown in Figs. 2 and 3, that is, with the lug $G'$ in engagement with the notch $F'$ to hold the raising wheels E in an upper dormant position. When the lug $G'$ engages the notch $F'$ then the shoulder $G^2$ is a distance rearward of the shoulder $F^2$ and when the bar G is pushed forward then the locking lug $G'$ moves out of engagement with the notch $F'$ and at the same time the shoulder $G^2$ moves into engagement with the shoulder $F^2$ and on a further forward pushing of the bar G the cam F is turned and with it the shaft D and the raising wheels E until the lugs $E^2$ engage the ground, as previously explained. Springs I connect the shaft D with the bar G so as to normally hold the arm H in sliding contact with the shaft D. The rear end of the locking and actuating bar G is pivotally connected with a hand lever J fulcrumed at J' on the frame A of the harrow, and this hand lever J is under the control of the operator for pushing the bar G forward with a view to unlock the cam F and then turn the same, as previously explained to give an initial turning movement to the raising wheels E. A spring K connects the bar G with the lever J to normally hold the bar G in a rearmost position, that is, with the locking lug G' in engagement with the notch F'.

As previously explained, the raising wheels E are normally in an upper dormant position and are locked therein by the locking lugs G' engaging the notch F' of the cam F. Now when the harrow is dragged over the ground and extraneous matter, such as weeds, brush, straw and the like, is gathered up by the teeth B and it is desired to discharge the same from the teeth then the operator swings the lever J thereon to unlock the cam F and to turn the same so that an initial turning movement is given to the raising wheels E to cause the latter to engage the ground and thus lift the harrow off the ground and thereby permit the accumulated extraneous matter to drop off the teeth onto the ground. By having the rims E' of the wheels E in the form of semi-polygons it is evident that a jerky motion is given to the harrow as the wheels travel over the ground and consequently the extraneous matter is shaken off the teeth, and the harrow is kept in a raised position until the rear end of the harrow has practically passed the extraneous matter on the ground and consequently the harrow is in clean condition and again engages the ground.

The cleaning attachment shown and described is very simple and durable in construction, and is composed of comparatively few parts which can be readily applied to harrows as now constructed.

Having thus described my invention, I claim as new and desire to secure by Letters Patent:

1. In combination with a harrow, a transverse shaft journaled on the harrow, segmental raising wheels on the ends of the said shaft and normally off the ground, a cam on the said shaft, and a manually-controlled locking and actuating bar engaging the said cam and holding the same normally locked with the raising wheels in upper dormant position, the said bar being adapted to unlock and turn the said cam to engage the raising wheels with the ground.

2. In combination with a harrow, a transverse shaft journaled on the harrow, segmental raising wheels on the ends of the said shaft and normally off the ground, a cam on the said shaft and provided on its peripheral face with a notch and with a shoulder, a locking and actuating bar mounted to slide forward and backward and having a locking lug adapted to engage the said cam notch, and an actuating lug adapted to engage the said cam shoulder, and a hand lever fulcrumed on the harrow and connected with the said bar to shift the latter forward or backward.

3. In combination with a harrow, a transverse shaft journaled on the harrow, segmental raising wheels on the ends of the said shaft and normally off the ground, a cam on the said shaft and provided on its peripheral face with a notch and a shoulder spaced from the notch, a locking and actuating bar having a locking lug and an actuating lug, of which the locking lug is adapted to engage the said cam notch and the said actuating lug is adapted to engage the said cam shoulder, a supporting arm on the said bar and resting on the said shaft, a spring pressing the said bar to hold the said arm in engagement with the said shaft, and a hand lever fulcrumed on the harrow and connected with the said bar.

4. In combination with a harrow, a transverse shaft journaled on the harrow, segmental raising wheels on the ends of the said shaft and normally off the ground, the said raising wheels having each a semi-polygonal rim and the forward end of each rim having an angular projection, a cam on the said shaft, and a manually-controlled locking and actuating bar engaging the said cam and holding the same normally locked with the raising wheels in upper dormant position, the said bar being adapted to unlock and turn the said cam to engage the raising wheels with the ground.

In testimony whereof I have signed my name to this specification in the presence of two subscribing witnesses.

HAROLD E. SMOCK.

Witnesses:
ANNA M. ANTONIDES,
WM. A. FOUNTAIN.

---

Copies of this patent may be obtained for five cents each, by addressing the "Commissioner of Patents, Washington, D. C."